Jan. 20, 1925.

W. W. BROWER

SCRAPER

Filed Oct. 15, 1923

1,523,579

INVENTOR
William W. Brower,
BY
Arthur M. Hood.
ATTORNEY

Patented Jan. 20, 1925.

1,523,579

UNITED STATES PATENT OFFICE.

WILLIAM W. BROWER, OF SHEFFIELD, IOWA.

SCRAPER.

Application filed October 15, 1923. Serial No. 668,496.

*To all whom it may concern:*

Be it known that I, WILLIAM W. BROWER, a citizen of the United States, residing at Sheffield, in the county of Franklin and State of Iowa, have invented a new and useful Scraper, of which the following is a specification.

The object of my invention is to produce a neat, efficient and cheap scraper for use in cleansing cooking utensils and similar articles.

The accompanying drawings illustrate my invention:

Figure 1:
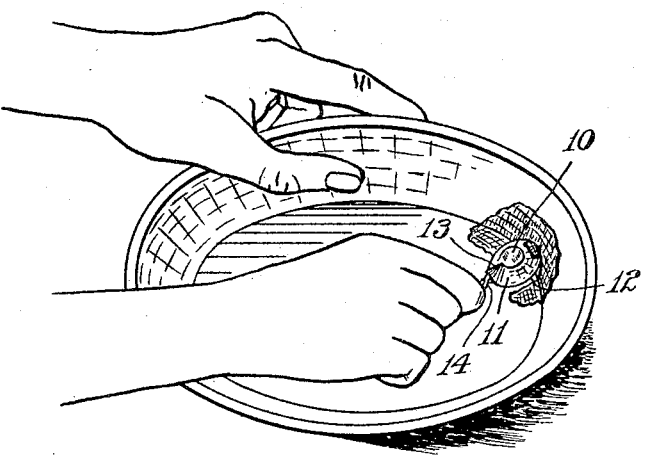
Fig. 1 is a perspective view of one of my utensils in use.
Figure 2:
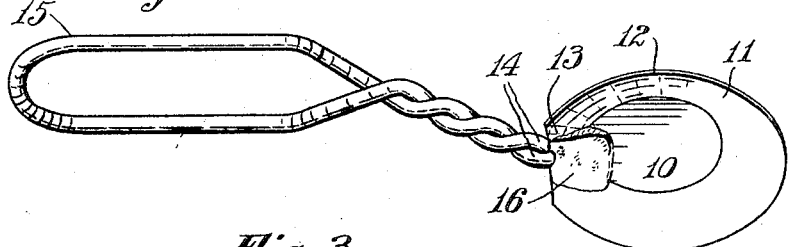
Fig. 2 is a perspective view of one form of the utensil from the underside.
Figure 3:
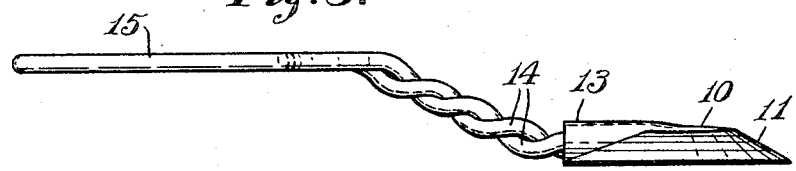
Fig. 3 is a side elevation of the article shown in Fig. 2.

In Figs. 1, 2 and 3 of the drawing, the scraper portion of the utensil is shown as formed of a cupped sheet of metal comprising a central portion 10 and a surrounding flange 11, the edge or circumference 12 of which may be sharpened. At one point the flange 12 is distorted, as illustrated at 13, to form a recess in which the twisted-together ends 14 of a wire handle 15 may be laid and held in place by any suitable means, such for instance as a mass of solder 16.

Figure 4:
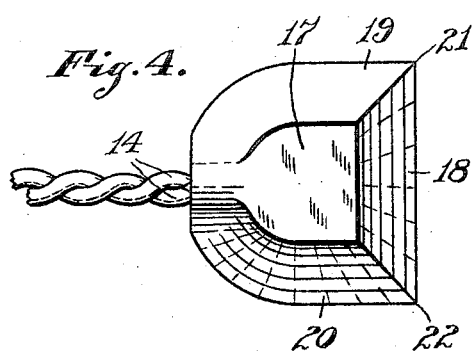
Fig. 4 is a fragmentary plan of a modification.

In Fig. 4 the scraper body 17 is slightly different in shape so as to be provided with a series of flanges 18, 19 and 20 so arranged as to form substantially rectangular corners at 21 and 22 so that the instrument may be used to get into corners of rectangular, or substantially rectangular, cooking utensils.

The handle 15—14 is preferably bent, as shown in the drawings, so that the scraping or cutting edge of the flange may be laid substantially flat against the bottom or sides of a cooking utensil, while the hand of the operator is free from the surface being scraped.

I claim as my invention:

A scraper comprising a scraping head having an outwardly flaring flange the periphery of which forms a scraping edge, said flange being distorted at one point to form a handle seat, and a carrying handle attached to said head within the distorted portion of the flange.

In witness whereof, I WILLIAM W. BROWER have hereunto set my hand.

WILLIAM W. BROWER.